(12) United States Patent
Zhao et al.

(10) Patent No.: US 12,047,154 B2
(45) Date of Patent: Jul. 23, 2024

(54) BEAM TRACKING METHOD AND APPARATUS

(71) Applicant: China Academy of Telecommunications Technology, Beijing (CN)

(72) Inventors: Li Zhao, Beijing (CN); Rui Zhao, Beijing (CN); Rui Shi, Beijing (CN); Qiong Li, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 904 days.

(21) Appl. No.: 17/043,630

(22) PCT Filed: Apr. 1, 2019

(86) PCT No.: PCT/CN2019/080893
§ 371 (c)(1),
(2) Date: Sep. 29, 2020

(87) PCT Pub. No.: WO2019/192436
PCT Pub. Date: Oct. 10, 2019

(65) Prior Publication Data
US 2021/0021328 A1  Jan. 21, 2021

(30) Foreign Application Priority Data

Apr. 3, 2018  (CN) .......................... 201810290858.4

(51) Int. Cl.
*H04B 7/08* (2006.01)
*G08G 1/00* (2006.01)
(Continued)

(52) U.S. Cl.
CPC ........... *H04B 7/086* (2013.01); *G08G 1/0112* (2013.01); *G08G 1/0137* (2013.01); *G08G 1/167* (2013.01);
(Continued)

(58) Field of Classification Search
CPC .... H04B 7/086; H04B 7/0617; G08G 1/0112; G08G 1/0137; G08G 1/167; G08G 1/20;
(Continued)

(56) References Cited

U.S. PATENT DOCUMENTS 6,574,460 B1   6/2003  Lindenmeier et al.
9,666,067 B1 *  5/2017  Nagpal ................ G08G 1/0112
(Continued)

FOREIGN PATENT DOCUMENTS

CN     103096247 A    5/2013
CN     105992130 A   10/2016
(Continued)

OTHER PUBLICATIONS

Giordani, Marco, Andrea Zanella, and Michele Zorzi. "Millimeter wave communication in vehicular networks: Challenges and opportunities." 2017 6th International Conference on Modern Circuits and Systems Technologies (MOCAST). IEEE, 2017. (Year: 2017).*
(Continued)

*Primary Examiner* — Alan D Hutchinson
(74) *Attorney, Agent, or Firm* — Kilpatrick Townsend & Stockton LLP (57) ABSTRACT

A beam tracking method and apparatus, describes that, during vehicle platooning, following vehicles have a low reliability of receiving a beam signal and a low speed of discovering a beam signal. Said method includes: receiving first position information of a designated vehicle obtaining, on the basis of the first position information and second position information of a following vehicle, relative position
(Continued)

information of the designated vehicle and the following vehicle; and tracking, according to the relative position information, a beam transmitted by the designated vehicle.

11 Claims, 6 Drawing Sheets

(51) Int. Cl.
    *G08G 1/01*     (2006.01)
    *G08G 1/16*     (2006.01)
    *H04W 4/029*     (2018.01)
    *H04W 4/40*     (2018.01)
    *H04W 72/044*     (2023.01)

(52) U.S. Cl.
    CPC ............... *G08G 1/20* (2013.01); *G08G 1/22* (2013.01); *H04W 4/029* (2018.02); *H04W 4/40* (2018.02); *H04W 72/046* (2013.01)

(58) Field of Classification Search
    CPC ........... G08G 1/22; G08G 1/00; H04W 4/029; H04W 4/40; H04W 72/046; H04W 72/04; H04W 4/025; G06F 16/29
    See application file for complete search history.

(56) References Cited

U.S. PATENT DOCUMENTS

2017/0149130 A1     5/2017     Kim
2017/0349176 A1     12/2017     Alden et al.

FOREIGN PATENT DOCUMENTS

| CN | 106785446 A | 5/2017 |
| CN | 107135021 A | 9/2017 |
| CN | 107736071 A | 2/2018 |
| WO | 2018054498 A1 | 3/2018 |

OTHER PUBLICATIONS

Choi, Junil, et al. "Millimeter-wave vehicular communication to support massive automotive sensing." IEEE Communications Magazine 54.12 (2016): 160-167. (Year: 2016).*

Va, Vutha, Haris Vikalo, and Robert W. Heath. "Beam tracking for mobile millimeter wave communication systems." 2016 IEEE Global Conference on Signal and Information Processing (GlobalSIP). IEEE, 2016. (Year: 2016).*

Garcia, Nil, et al. "Location-aided mm-wave channel estimation for vehicular communication." 2016 IEEE 17th International Workshop on Signal Processing Advances in Wireless Communications (SPAWC). IEEE, 2016. (Year: 2016).*

Choi Junil et al., "Millimeter-Wave Vehicular Communication to Support Massive Automotive Sensing", IEEE Communications Magazine, IEEE Service Center, Piscataway, US, vol. 54, No. 12, Dec. 1, 2016, pp. 160-167, XP011637192, ISSN: 0163-6804, DOI: 10.1109/MCOM.2016.1600071 CM.

Blackman S et al.: "Design and Analysis of Modern Tracking Systems, Chapter 6: Basic Methods for Data Association", Design and Analysis of Modern Tracking Systems, Jan. 1, 1999, total 100 pages, XP002330640.

* cited by examiner

Fig. 1

--Prior Art--

BEAM TRACKING METHOD AND APPARATUS

This application is a national phase entry under 35 U.S.C. § 371 of International Application No. PCT/CN2019/080893, filed on Apr. 1, 2019, which claims priority of Chinese Patent Application No. 201810290858.4, filed with the China National Intellectual Property Administration (CNIPA) on Apr. 3, 2018 and entitled "Beam Tracking Method and Apparatus", the entire content of which is incorporated herein by reference.

FIELD

The disclosure relates to the field of vehicle to everything, and in particular to a beam tracking method and apparatus.

BACKGROUND

In the enhanced Vehicle to Everything (eV2X), vehicles with the same destination are organized into a fleet by using the vehicle platooning mechanism. The management and driving control for all vehicles in the fleet are realized by way of communications between the head vehicle and each of all other vehicles.

Figure 1:
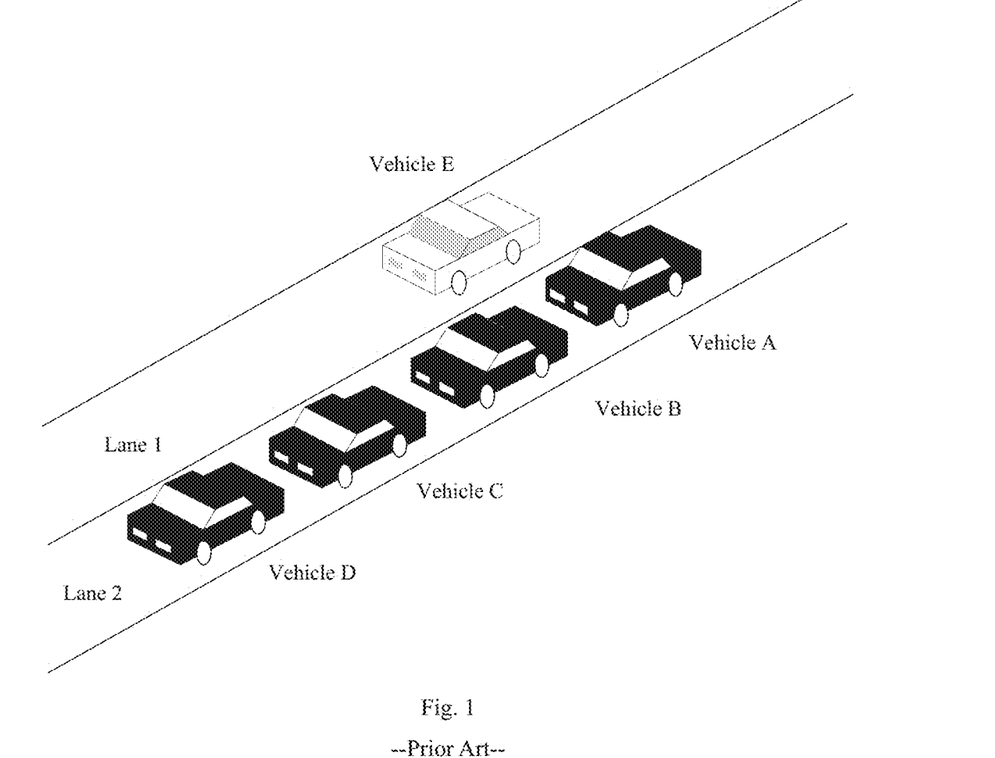
FIG. 1 is a schematic diagram of a platooning fleet in the related art of the disclosure.

As shown in FIG. 1, the vehicles A, B, C and D are driving in the lane 2, and forming a platooning fleet. The vehicle E is driving in the lane 1, and not forming a platooning fleet with the vehicles A~D.

In related art, the head vehicle A in the platooning fleet usually sends relevant information to the following vehicles B, C and D in the unicast or multicast manner, to enable the following vehicles B, C and D to perform corresponding operations based on the relevant information sent by the head vehicle A, so that the following vehicles B, C and D keep consistent with the running trajectory of the head vehicle A.

However, in the Vehicle to Everything, the relevant information sent by the head vehicle is usually sent in the form of beam signal. On one hand, the energy of the signal is sent to all directions in the space, so that the signal energy received by the following vehicles is only a part of the signal energy sent by the head vehicle, and on the other hand, the running speed of the vehicle is fast and the change in lane topology may also be quick, so that the signal energy received by the following vehicles will be further weaken. Since the signal energy is weaken, the reliability of receiving the signal from the preceding vehicle will be reduced, and the discovery time of the beam signal will be prolonged, so that the following vehicles cannot keep the same running trajectory as the head vehicle in time and accurately.

Therefore, how to improve the reliability in receiving the beam signal from the preceding vehicle and find the beam signal quickly becomes a problem to be solved urgently in the Vehicle to Everything.

BRIEF SUMMARY

The disclosure provides a beam tracking method and apparatus.

In one embodiment, a beam tracking method provided by embodiments of the disclosure is applied to a following vehicle in the vehicle platooning. Embodiments describe:
  receiving first position information of a designated vehicle;
  obtaining relative position information of the designated vehicle and the following vehicle based on the first position information and second position information of the following vehicle;
  tracking a beam sent by the designated vehicle based on the relative position information.

Since the designated vehicle is in front of the following vehicle in the vehicle platooning, the beam sent to the following vehicle must be sent backwards. Therefore, the following vehicle can effectively track the beam of the designated vehicle based on the relative position information with respect to the designated vehicle, and improving the reliability in receiving the beam sent by the designated vehicle; and there is no need to scan the beams at positions other than those indicated by the relative position information, so the time of beam discovery can further be reduced.

Combining with the first aspect, in a first possible embodiment of the first aspect, the first position information and the second position information each includes:
  at least one of longitude and latitude information, lane information or height information;
  the height information is a height of the designated vehicle or the following vehicle relative to a preset horizontal position.

Combining with the first possible embodiment of the first aspect, in a second possible embodiment of the first aspect, the obtaining relative position information of the designated vehicle and the following vehicle based on the first position information and second position information of the following vehicle, includes:
  calculating a vector angle of the following vehicle relative to the designated vehicle based on longitude and latitude information in the first position information and longitude and latitude information in the second position information to obtain the relative position information.

Combining with the first possible embodiment of the first aspect, in a third possible embodiment of the first aspect, the obtaining relative position information of the designated vehicle and the following vehicle based on the first position information and second position information of the following vehicle, includes:
  predicting a motion trajectory of the designated vehicle based on the first position information and driving information of the designated vehicle; and
  calculating a relative motion relationship between the following vehicle and the designated vehicle according to the motion trajectory and the second position information to obtain the relative position information.

Combining with the third possible embodiment of the first aspect, in a fourth possible embodiment of the first aspect, the tracking the beam sent by the designated vehicle based on the relative position information, includes:
  adjusting a receiving direction in which the following vehicle receives the beam sent by the designated vehicle based on the second position information and the relative position information to track the beam.

Combining with the embodiments of the first aspect, in a fifth possible embodiment of the first aspect, the tracking the beam sent by the designated vehicle based on the relative position information, includes:
  tracking the beam sent by the designated vehicle at a configured reception angle based on the relative position information;
  the configured reception angle is a range of reception angles at which the following vehicle receives the beam and which is calculated by a communication device based on the relative position information and a motion relationship between the designated vehicle and the following vehicle, and the motion relationship is predicted on a dynamic map according to the first position information and the second position information.

Combining with the embodiments of the first aspect, in a sixth possible embodiment of the first aspect, the tracking the beam sent by the designated vehicle based on the relative position information, includes:

performing space grid division on a signal space between the first position information and the second position information in a signal space grid division way specified by a communication device to obtain grid spaces between the designated vehicle and the following vehicle;

determining, from the grid spaces, a grid space through which the beam passes as an effective grid space according to a sending direction of the beam and the relative position information; and tracking the beam sent by the designated vehicle in the effective grid space.

In a second aspect, embodiments of the disclosure provide another beam tracking method applied to a communication device in the vehicle platooning, including:

receiving first position information reported by a designated vehicle and second position information reported by a following vehicle;

obtaining relative position information of the designated vehicle and the following vehicle based on the first position information and the second position information; and generating configuration information of the following vehicle according to the relative position information, for the following vehicle to track a beam sent by a preceding vehicle according to the configuration information.

Since the designated vehicle is in front of the following vehicle in the vehicle platooning, the beam sent to the following vehicle must be sent backwards. Therefore, the communication device can obtain the relative position information of the following vehicle and the designated vehicle according to the received first position information of the designated vehicle and second position information of the following vehicle, and can thus generate the configuration information of the following vehicle according to the relative position information, so that the following vehicle tracks the beam sent by the preceding vehicle according to the configuration information, and then the following vehicle implements the beam tracking of the designated vehicle, improving the reliability in receiving the beam sent by the designated vehicle; and the following vehicle does not need to scan the beams at positions other than those indicated by the relative position information, so the time for the following vehicle to find the beam can further be reduced.

Combining with the embodiments of the second aspect, in a first possible embodiment of the second aspect, the generating configuration information of the following vehicle according to the relative position information, includes:

determining an optimal grid from a preset grid set according to the relative position information, for the following vehicle to perform gridding processing on a signal space between the designated vehicle and the following vehicle according to a size or range indicated by the optimal grid; and packaging the optimal grid in a preset data format to generate the configuration information.

Combining with the embodiments of the second aspect, in a second possible embodiment of the second aspect, the generating configuration information of the following vehicle according to the relative position information, includes:

predicting a motion relationship between the designated vehicle and the following vehicle on a dynamic map based on the first position information and the second position information; and generating a reception angle at which the following vehicle receives the beam based on the motion relationship and the relative position information to obtain the configuration information.

Combining with any one of the second aspect, the first possible embodiment of the second aspect, and the second possible embodiment of the second aspect, in a third possible embodiment of the second aspect, the communication device is:

a base station or an RSU.

In a third aspect, embodiments of the disclosure provide a beam tracking apparatus applied to a following vehicle in the vehicle platooning, including:

a receiving device configured to receive first position information of a designated vehicle;

an obtaining device configured to obtain relative position information of the designated vehicle and the following vehicle based on the first position information and second position information of the following vehicle; and a tracking device configured to track a beam sent by the designated vehicle based on the relative position information.

Combining with the embodiments of the third aspect, in a first possible embodiment of the third aspect, the first position information and the second position information each includes:

at least one of longitude and latitude information, lane information or height information;

the height information is a height of the designated vehicle or the following vehicle relative to a preset horizontal position.

Combining with the first possible embodiment of the third aspect, in a second possible embodiment of the third aspect, the obtaining device is configured to:

calculate a vector angle of the following vehicle relative to the designated vehicle based on longitude and latitude information in the first position information and longitude and latitude information in the second position information to obtain the relative position information.

Combining with the first possible embodiment of the third aspect, in a third possible embodiment of the third aspect, the obtaining device is configured to:

predict a motion trajectory of the designated vehicle based on the first position information and driving information of the designated vehicle; and calculate a relative motion relationship between the following vehicle and the designated vehicle according to the motion trajectory and the second position information to obtain the relative position information.

Combining with the third possible embodiment of the third aspect, in a fourth possible embodiment of the third aspect, the tracking device is configured to:

adjust a receiving direction in which the following vehicle receives the beam sent by the designated vehicle based on the second position information and the relative position information to track the beam.

Combining with the embodiments of the third aspect, in a fifth possible embodiment of the third aspect, the tracking device is configured to:

track the beam sent by the designated vehicle at a configured reception angle based on the relative position information;

the configured reception angle is a range of reception angles at which the following vehicle receives the beam and which is calculated by a communication device based on the relative position information and a motion relationship between the designated vehicle and the following vehicle, and the motion relationship is predicted on a dynamic map according to the first position information and the second position information.

Combining with the embodiments of the third aspect, in a sixth possible embodiment of the third aspect, the tracking device is configured to:

perform space grid division on a signal space between the first position information and the second position information in a signal space grid division way specified by a communication device to obtain grid spaces between the designated vehicle and the following vehicle;

determine, from the grid spaces, a grid space through which the beam passes as an effective grid space according to a sending direction of the beam and the relative position information; and track the beam sent by the designated vehicle in the effective grid space.

In a fourth aspect, embodiments of the disclosure further provide a beam tracking apparatus applied to a communication device in vehicle platooning, including:

a receiving device configured to receive first position information reported by a designated vehicle and second position information reported by a following vehicle;

an obtaining device configured to obtain relative position information of the designated vehicle and the following vehicle based on the first position information and the second position information; and a generating device configured to generate configuration information of the following vehicle according to the relative position information, for the following vehicle to track a beam sent by a preceding vehicle according to the configuration information.

Combining with the embodiments of the fourth aspect, in a first possible embodiment of the fourth aspect, the generating device is configured to:

determine an optimal grid from a preset grid set according to the relative position information, for the following vehicle to perform gridding processing on a signal space between the designated vehicle and the following vehicle according to a size or range indicated by the optimal grid; and package the optimal grid in a preset data format to generate the configuration information.

Combining with the first possible embodiment of the fourth aspect, in a second possible embodiment of the fourth aspect, the generating device is configured to:

predict a motion relationship between the designated vehicle and the following vehicle on a dynamic map based on the first position information and the second position information; and generate a reception angle at which the following vehicle receives the beam based on the motion relationship and the relative position information to obtain the configuration information.

Combining with any one of the fourth aspect, the first possible embodiment of the fourth aspect, and the second possible embodiment of the fourth aspect, in a third possible embodiment of the fourth aspect, the communication device is:

a base station or an RSU.

In a fifth aspect, embodiments of the disclosure further provide a beam tracking apparatus, including:

at least one processor, and a memory connected to the at least one processor;

the memory stores instructions that can be executed by the at least one processor, and the at least one processor performs the method as described in the above first or second aspect by executing the instructions stored in the memory.

In a sixth aspect, embodiments of the disclosure further provide a computer readable storage medium storing computer instructions. When the computer instructions are running on a computer, the computer is caused to perform the method as described in the above first or second aspect.

DETAILED DESCRIPTION OF THE EMBODIMENTS

Embodiments of disclosure provide that the following vehicles have the low reliability in receiving beam signals and find the beam signals slowly during the vehicle platooning.

A beam tracking solution is provided, which includes: receiving first position information of a designated vehicle; obtaining relative position information of the designated vehicle and the following vehicle based on the first position information and second position information of the following vehicle; and tracking a beam sent by the designated vehicle based on the relative position information.

In the above solution, after the first position information of the designated vehicle and the second position information of the following vehicle are obtained, the relative position information of the designated vehicle and the following vehicle is determined according to the first position information and the second position information, and then the beam sent by the designated vehicle is tracked according to the relative position information. Since the designated vehicle is in front of the following vehicle in the vehicle platooning, the beam sent to the following vehicle must be sent backwards. Therefore, the following vehicle can effectively track the beam of the designated vehicle according to the relative position information with respect to the designated vehicle, and improving the reliability in receiving the beam sent by the designated vehicle; and there is no need to scan the beams at positions other than those indicated by the relative position information, so the time of beam discovery can further be reduced.

Figure 2:
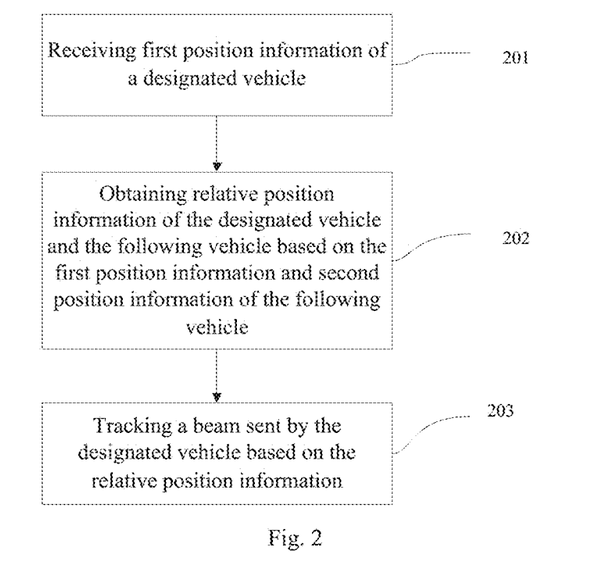
FIG. 2 is a schematic flow diagram of a beam tracking method provided by an embodiment of the disclosure.

Please referring to FIG. 2, embodiments of the disclosure provide a beam tracking method applied to a following vehicle in the vehicle platooning. The processing procedure of the method is as follows.

Step 201: receiving first position information of a designated vehicle.

Here, the designated vehicle refers to a vehicle driving before the following vehicle, which may be the head vehicle or a preceding vehicle. Which specific vehicle before the following vehicle is not limited here. In actual applications, the designated vehicle may be preset as required, or one of the vehicles before the following vehicle is determined as the designated vehicle according to the preset strategy.

The first position information and the second position information may be at least one of the longitude and latitude information, lane information or height information. The height information is the height of the designated vehicle or the following vehicle relative to a preset horizontal position.

The designated vehicle and the following vehicle can obtain their position information (such as longitude and latitude, height information, lane information of the lane where they are located, etc.) through the Global Navigation Satellite System (GNSS).

The global navigation satellite system may be Beidou system, Global Positioning System (GPS), Glonass satellite navigation system (GLONASS), Galileo satellite navigation system (Galileo), etc.

The following vehicle may obtain the first position information of the designated vehicle regularly or irregularly, or may obtain the first position information of the designated vehicle by means of inquire-response. The way in which the following vehicle obtains the first position information may be to communicate with the designated vehicle directly, or may be to obtain the first position information of the designated vehicle indirectly through the base station or RSU at the network side. There is no limitation here on which way is specifically used to obtain the first position information.

After the following vehicle obtains the first position information of the designated vehicle, step 202 can be performed.

Step 202: obtaining relative position information of the designated vehicle and the following vehicle based on the first position information and second position information of the following vehicle.

In one embodiment, there are several ways to obtain the relative position information of the designated vehicle and the following vehicle.

In a first way, the vector angle of the following vehicle relative to the designated vehicle can be calculated based on the longitude and latitude information in the first position information and the longitude and latitude information in the second position information to obtain the relative position information.

In one embodiment, assuming that the longitude and latitude coordinates of the designated vehicle are (116.329422, 39.362288) and the longitude and latitude coordinates of the following vehicle are (116.329709, 39.361228), then it can be calculated that the designated vehicle is in the front left of the following vehicle by 15 degrees at the distance of 120 meters and is driving to the north along the lane. Here the vector angle needs to be 15° in the front left, so 15° in the front left is used as the relative position information.

Through the longitude and latitude information of the designated vehicle and the following vehicle, the vector angle of the following vehicle and the designated vehicle can be calculated quickly and accurately, and then the relative position information of the following vehicle and the designated vehicle can be obtained quickly. Since it is very convenient to obtain the longitude and latitude which are not restricted by region, the method of obtaining the relative position information through the longitude and latitude information can be widely used all over the world.

In a second way, the motion trajectory of the designated vehicle can be predicted based on the first position information and the driving information of the designated vehicle; and a relative motion relationship between the following vehicle and the designated vehicle is calculated according to the motion trajectory and the second position information to obtain the relative position information.

Here, the driving information may include driving speed, acceleration, direction, and so on.

In one embodiment, the first position information of the designated vehicle is (116.329422, 39.362288), and the driving information is driving to the north at the constant driving speed of 120 km/h. Then the motion trajectory of the designated vehicle in a period of time in the future can be predicted, and then according to the predicted motion trajectory, the second position information (116.329422, 39.360288) of the following vehicle and the driving information of the following vehicle (for example, also driving to the north at the constant driving speed of 120 km/h), the relative motion relationship between the following vehicle and the designated vehicle can be calculated as driving to the north with keeping the vehicle distance of 222 meters, to and obtain the relative position information of the following vehicle and the designated vehicle.

The motion trajectory of the designated vehicle is predicted through the first position information and driving information of the designated vehicle, and the relative motion relationship between the following vehicle and the designated vehicle is calculated according to the motion trajectory of the designated vehicle and the second position information of the following vehicle. The following vehicle may obtain the relative position relationship with the designated vehicle in advance, and then adjusts the beam for tracking the designated vehicle according to the relative position relationship, making the tracking beam more intelligent.

After the relative position information of the following vehicle and the designated vehicle is obtained, step 203 can be performed.

Step 203: tracking a beam sent by the designated vehicle based on the relative position information.

In one embodiment, the tracking of the beam sent by the designated vehicle can be implemented by the following vehicle in the following ways.

In a first way: the receiving direction in which the following vehicle receives the beam sent by the designated vehicle is adjusted based on the second position information and the relative position information, to track the beam.

Figure 3:
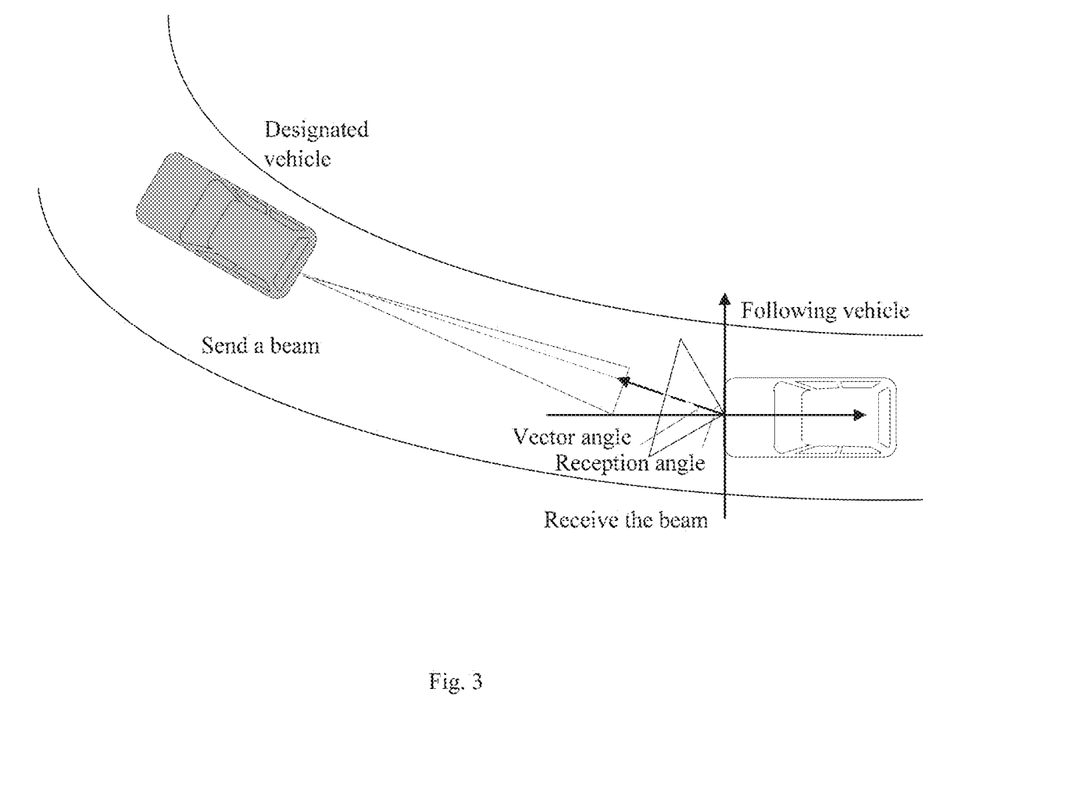
FIG. 3 is a first schematic diagram of a reception angle of a beam adjusted for the following vehicle provided by an embodiment of the disclosure.

In one embodiment, referring to FIG. 3, the following vehicle calculates the direction from the following vehicle to the designated vehicle through the first position information and the second position information, then determines the vector angle between the following vehicle and the designated vehicle, determines the reception angle of the beam according to the vector angle, and adjusts the receiving direction in which the following vehicle receives the beam sent by the designated vehicle in the angle range indicated by the reception angle. In one embodiment, the reception angle may be obtained by taking the line of a point position of the following vehicle and a point position of the designated vehicle as the axis and multiplying the vector angle by a preset proportionality coefficient as the included angle.

Figure 4:
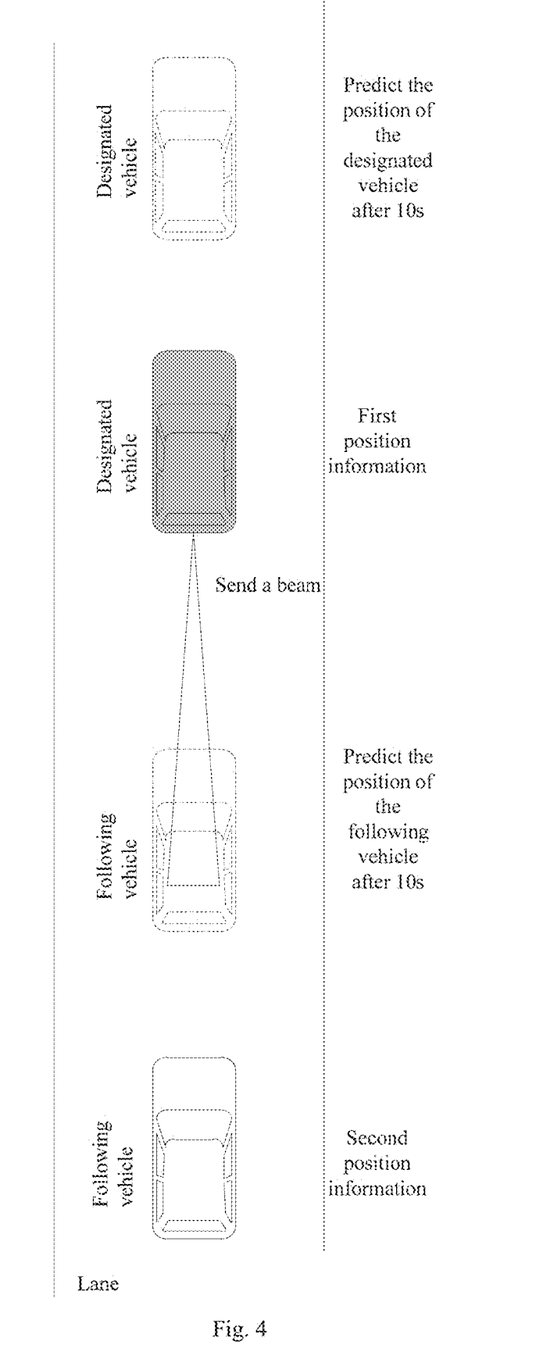
FIG. 4 is a second schematic diagram of a reception angle of a beam adjusted for the following vehicle provided by an embodiment of the disclosure to implement the beam tracking.

Referring to FIG. 4, it is assumed that the longitude and latitude coordinates in the first position information of the designated vehicle are (116.329422, 39.362288), the designated vehicle is driving to the north along the lane, and the driving information is driving at an average speed of 120 km/h. The designated vehicle can send the first position information to the following vehicle by way of broadcasting, and the first position information may further carry the dynamic map information of the designated vehicle.

The following vehicle can predict the motion trajectory of the designated vehicle as driving to the north at the speed of 120 km/h along the lane at the position (116.329422, 39.362288) according to the first position information and the driving information. In one embodiment, it can be predicted that the designated vehicle will reach a position in front of the first position information (116.329422, 39.362288) at the distance of 333 meters after 10 s, and then according to the motion trajectory of the designated vehicle and the longitude and latitude (116.329709, 39.361228) in the second position information of the following vehicle, the relative motion relationship between the following vehicle and the designated vehicle can be calculated as: the designated vehicle is driving to the north with keeping 222 meters in front of the following vehicle, to and obtain the relative position information of the following vehicle and the designated vehicle. Since this section of the road has no curve, there is no need to change the reception angle of the following vehicle, that is, the following vehicle continues receiving and scanning the beam of the designated vehicle at the latest adjusted reception angle to track the beam sent by the designated vehicle.

The following vehicle can determine the direction between the following vehicle and the designated vehicle quickly through the second position information and relative position information, and then adjust the receiving direction of the beam in time according to the change in their directions, so that the following vehicle can track the beam sent by the designated vehicle quickly and timely.

In a second way: the beam sent by the designated vehicle is tracked at a configured reception angle based on the relative position information. The configured reception angle is a range of reception angles at which the following vehicle receives the beam and which is calculated by a communication device based on the relative position information and a motion relationship between the designated vehicle and the following vehicle, and the motion relationship is predicted on a dynamic map according to the first position information and the second position information.

Here, the communication device may be a base station or a Road Side Unit (RSU).

Before the following vehicle tracks the beam sent by the designated vehicle at the configured reception angle, the following vehicle and the designated vehicle can report their position information to the communication device regularly or irregularly, so that the communication device predicts the motion relationship between the designated vehicle and the following vehicle on the dynamic map according to the first position information of the designated vehicle and the second position information of the following vehicle. The motion relationship is, for example, as follows: the designated vehicle and the following vehicle move on which road at what speeds and accelerations, or what speed and acceleration of the following vehicle relative to the designated vehicle, etc.; and then the communication device can calculate the range of reception angles at which the following vehicle receives the beam sent by the designated vehicle according to the motion relationship between the designated vehicle and the following vehicle and the relative position information, and then send the range of reception angles to the following vehicle.

Figure 5:
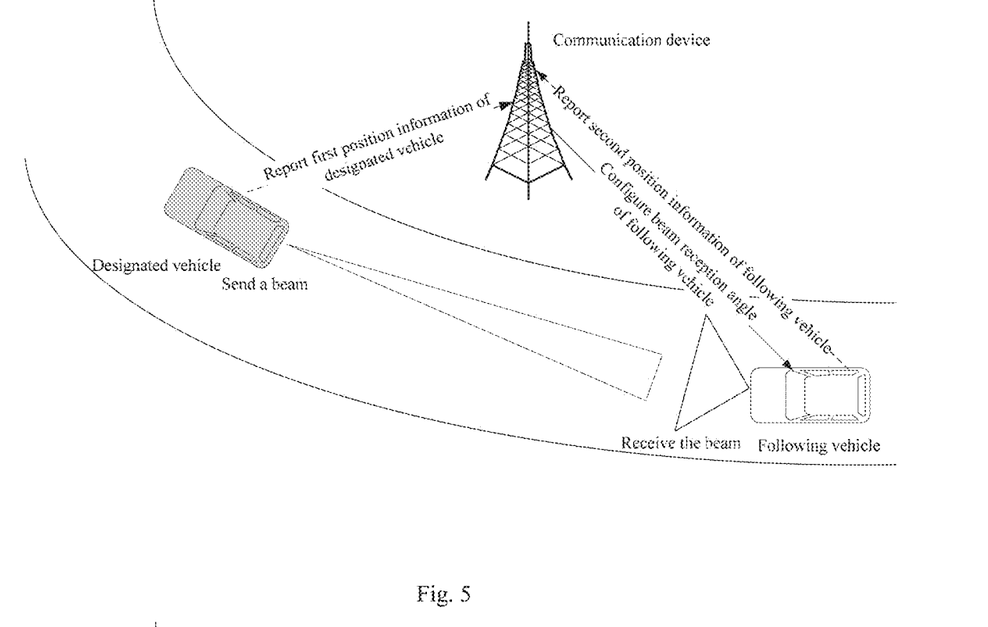
FIG. 5 is a schematic diagram in which the following vehicle adjusts the receiving direction of the beam according to the reception angle configured at the network side to realize the beam tracking provided by an embodiment of the disclosure.

Referring to FIG. 5, after receiving the range of reception angles sent by the communication device, the following vehicle adjusts the beam reception angle in the range of reception angles according to the relative position information, to track the beam information sent by the designated vehicle.

The beam sent by the designated vehicle is tracked by using the reception angle configured by the communication device for the following vehicle. The calculation of the reception angle is done in the communication device, so that the software and hardware requirements for the following vehicle can be reduced effectively; and the communication device has a high-definition dynamic map with higher precision, so that it is more accurate when using the relative position information to calculate the reception angle, and improving the accuracy when the following vehicle tracks the beam sent by the designated vehicle effectively.

In a third way: firstly the space grid division is performed on the signal space between the first position information and the second position information in a signal space grid division way specified by a communication device to obtain the grid spaces between the designated vehicle and the following vehicle; then a grid space through which the beam passes is determined from the grid spaces as the effective grid space according to the sending direction of the beam and the relative position information; and finally the beam sent by the designated vehicle is tracked in the effective grid space.

Here, the communication device may be a base station or a road side unit.

Figure 6:
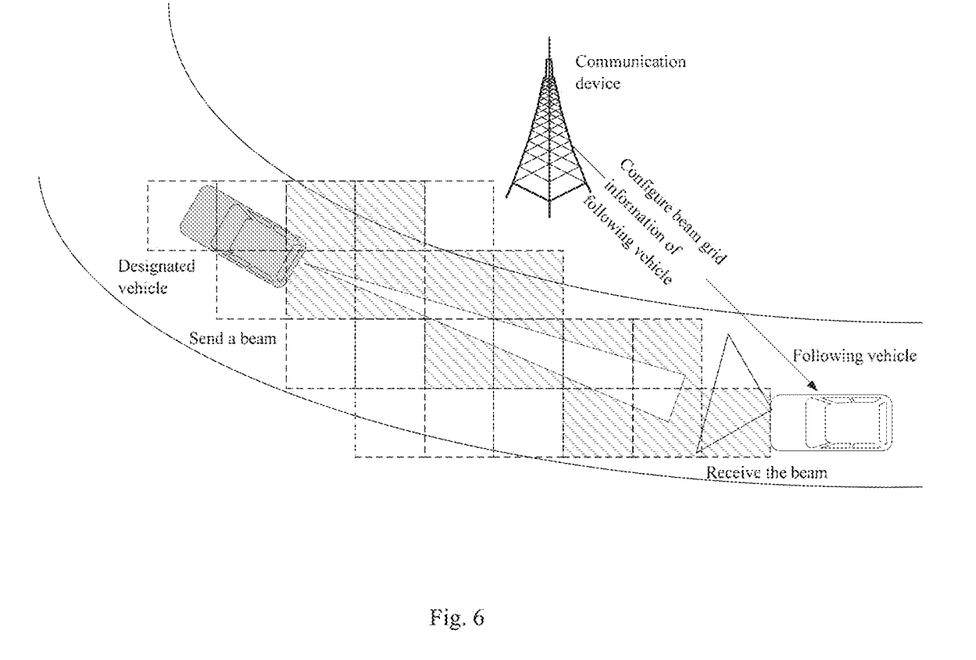
FIG. 6 is a schematic diagram of implementing the beam tracking by receiving and scanning beams within an effective grid range provided by an embodiment of the disclosure.

Referring to FIG. 6, the following vehicle may divide the signal space between the following vehicle and the designated vehicle into grid spaces (as shown by grids in FIG. 6) according to the received first position information of the designated vehicle and second position information of the following vehicle. The size or effective range of the grids is sent by the communication device at the network side to the following vehicle by way of configuration or pre-configuration, for example, there may be 5×10×2 signal space grids, the size of each grid is 1 m$^3$; and then the following vehicle can determine the grid spaces through which the beam passes from the divided grid spaces as the effective grid spaces (shown by the shaded parts in FIG. 6) in the beam sending direction according to the relative position information with the designated vehicle. The following vehicle receives and scans the beam in the effective grid spaces, to achieve the purpose of tracking the beam sent by the designated vehicle. The first position information may further include the high-definition dynamic map information of the designated vehicle.

The grid division is performed on the signal space between the following vehicle and the designated vehicle, and the grid spaces through which the beam may pass are determined as the effective grid spaces, so that the following vehicle scans and receives the beam in the effective grid spaces, which can reduce the spatial range in which the following vehicle scans the beam effectively, and saving the energy consumption of the following vehicle and improving the efficiency of beam tracking.

It should be understood that this method may be applicable to the nodes within the network coverage, and may also be applicable to the nodes outside the network coverage by way of network pre-configuration. The network may be a cellular network or Wi-Fi network, etc.

It should be understood that, in each of the embodiments implementing the beam tracking in the above first to third ways, both the designated vehicle and the following vehicle are moving continuously, so the acquisition of the first position information and the second position information, the calculation of the reception angle, the adjustment of the beam receiving direction, and the determination of the effective grid space are also performed continuously.

The beam tracking method is described above from the perspective of the following vehicle, and the beam tracking method will be described below from the perspective of the network side, i.e., the communication device.

Figure 7:
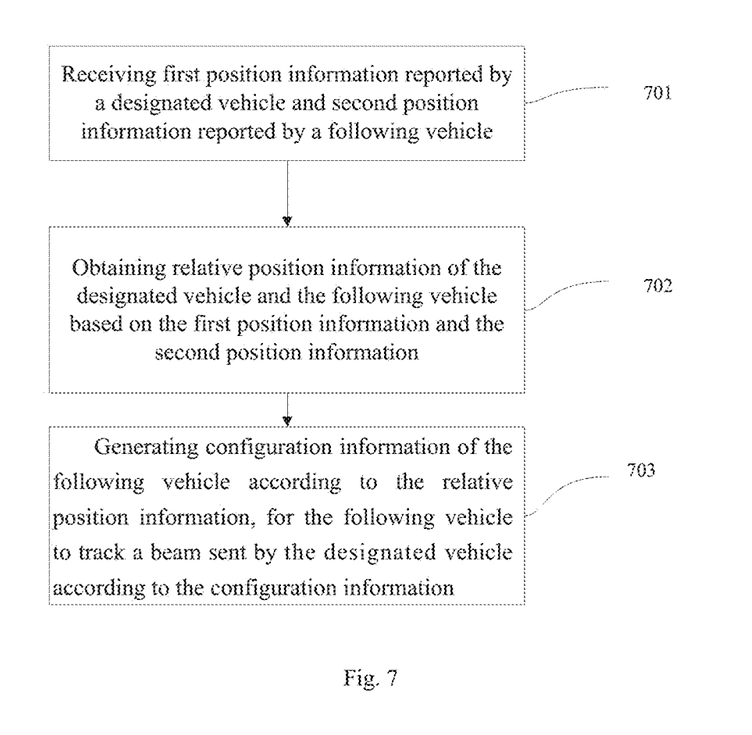
FIG. 7 is a schematic flow diagram of another beam tracking method provided by an embodiment of the disclosure.

Please referring to FIG. 7, embodiments of the disclosure provides a beam tracking method applied to a communication device in the vehicle platooning. The processing procedure of the method is as follows.

Step 701: receiving the first position information reported by a designated vehicle and the second position information reported by a following vehicle.

Here, the definitions of the designated vehicle, the first position information and the second position information are the same as those described in the foregoing method, and will not be repeated in order to save space.

The first position information and the second position information received by the communication device may be periodically reported by the designated vehicle or the following vehicle in accordance with the pre-agreed reporting time, or may be reported by the designated vehicle or the following vehicle by way of response after the communication device sends an inquiry message to the designated vehicle or the following vehicle. The specific reporting method is not limited here.

In one embodiment, the designated vehicle or the following vehicle may report its position information to the communication device every 1 minute, 3 minutes, 5 minutes, etc., or the communication device sends the position inquiry information to the designated vehicle or the following vehicle when the communication device requires the designated vehicle or the following vehicle to report its position information according to the dynamic map information, and the designated vehicle or the following vehicle returns the response information carrying the first or second position information in response to the position inquiry information after receiving the position inquiry information.

After the communication device obtains the first position information and the second position information, step 702 can be performed.

Step 702: obtaining the relative position information of the designated vehicle and the following vehicle based on the first position information and the second position information.

The specific method of obtaining the relative position information of the designated vehicle and the following vehicle is the same as the method in the above step 102, and will not be repeated here in order to save space.

After the relative position information is obtained, step 703 can be performed.

Step 703: generating the configuration information of the following vehicle according to the relative position information, so that the following vehicle tracks a beam sent by the preceding vehicle according to the configuration information.

There may be two ways to generate the configuration information of the following vehicle according to the relative position information.

In a first way, firstly the optimal grid is determined from a preset grid set according to the relative position information, so that the following vehicle can perform the gridding processing on the signal space between the designated vehicle and the following vehicle according to the size or range indicated by the optimal grid; and then the optimal grid is packaged in a preset data format to generate the configuration information.

Here, the preset grid set may be just a set with grid size of 0.5 $m^3$, 1 $m^3$, 1.5 $m^3$, etc., or 0.2-0.5 $m^3$, 0.5-1 $m^3$, 1.0-1.5 $m^3$, etc.

In one embodiment, the communication device determines, according to the relative position information of the designated vehicle and the following vehicle, that 5×10×2 signal space grids should be used between the designated vehicle and the following vehicle and that the size of each grid space is 1 $m^3$ which is determined as the optimal grid, and then packages the optimal grid in the preset data format to generate the configuration information, and sends the configuration information to the following vehicle, so that the following vehicle can perform the gridding processing on the signal space between the designated vehicle and the following vehicle according to the optimal grid in the configuration information.

The grid size that best meets the requirements of the following vehicle is selected from the grid set preset by the communication device through the relative position information between the following vehicle and the designated vehicle, so that the signal space between the following vehicle and the designated vehicle can be reasonably divided into the grid spaces with better degree of recognition to and obtain the optimal grid, and the optimal grid is sent to the following vehicle, so that the following vehicle performs the grid division on the signal space between the following vehicle and the designated vehicle according to the optimal grid, and determines the grid spaces through which the beam may pass as the effective grid spaces. Then the following vehicle scans and receives the beam in the effective grid spaces, which can reduce the spatial range in which the following vehicle scans the beam effectively, and saving the energy consumption of the following vehicle and improving the efficiency of beam tracking.

In a second way, firstly the motion relationship between the designated vehicle and the following vehicle is predicted on a dynamic map based on the first position information and the second position information; and then a reception angle at which the following vehicle receives the beam is generated based on the motion relationship and the relative position information to obtain the configuration information.

The beam sent by the designated vehicle is tracked by using the reception angle configured by the communication device for the following vehicle. The calculation of the reception angle is done in the communication device, so that the software and hardware requirements for the following vehicle can be reduced effectively; and the communication device has a high-definition dynamic map with higher precision, so that it is more accurate when using the relative position information to calculate the reception angle, and improving the accuracy when the following vehicle tracks the beam sent by the designated vehicle effectively.

Since the processing method of the communication device here is the same as that of the communication device in FIG. 5, it will not be repeated here.

The aforementioned communication device may specifically be a base station or an RSU.

Figure 8:
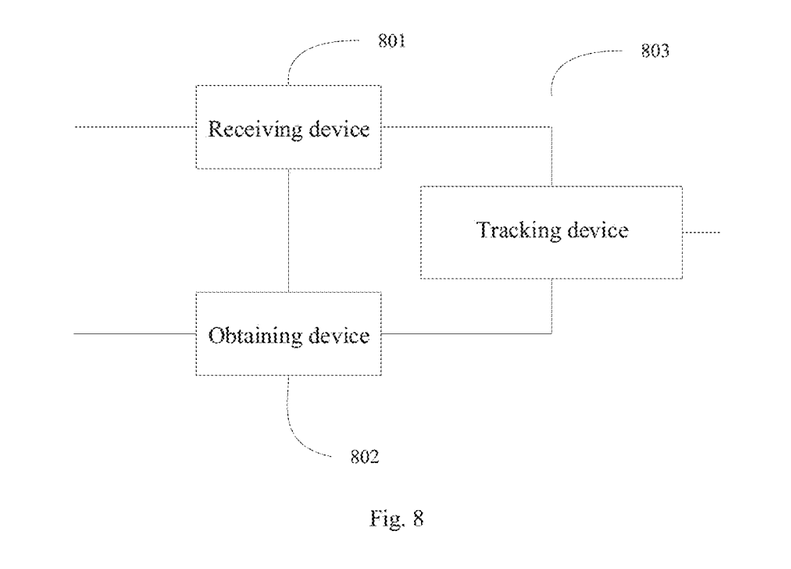
FIG. 8 is a schematic structural diagram of a beam tracking apparatus provided by an embodiment of the disclosure.

Based on the same inventive concept, embodiments of the disclosure provide a beam tracking apparatus applied to a following vehicle in the vehicle platooning. The specific embodiments of the beam tracking method of the apparatus can refer to the description of the method embodiments of the following vehicle, and the repeated description thereof will be omitted here. Referring to FIG. 8, the apparatus includes:
- a receiving device 801 configured to receive the first position information of a designated vehicle;
- an obtaining device 802 configured to obtain the relative position information of the designated vehicle and the following vehicle based on the first position information and the second position information of the following vehicle;
- a tracking device 803 configured to track a beam sent by the designated vehicle according to the relative position information.

In one embodiment, the first position information and the second position information include:
- at least one of longitude and latitude information, lane information or height information;
- the height information is the height of the designated vehicle or the following vehicle relative to a preset horizontal position.

In one embodiment, when obtaining the relative position information of the designated vehicle and the following vehicle based on the first position information and the second position information of the following vehicle, the obtaining device 802 is configured to:
- calculate the vector angle of the following vehicle relative to the designated vehicle based on the longitude and latitude information in the first position information and the longitude and latitude information in the second position information to obtain the relative position information.

In one embodiment, the obtaining device 802 is configured to:
- predict the motion trajectory of the designated vehicle based on the first position information and the driving information of the designated vehicle; and
- calculate a relative motion relationship between the following vehicle and the designated vehicle according to the motion trajectory and the second position information to obtain the relative position information.

In one embodiment, the tracking device 803 is configured to:
- adjust the receiving direction in which the following vehicle receives the beam sent by the designated vehicle based on the second position information and the relative position information to track the beam.

In one embodiment, the tracking device 803 is configured to:
- track the beam sent by the designated vehicle at a configured reception angle based on the relative position information;
- the configured reception angle is a range of reception angles at which the following vehicle receives the beam and which is calculated by a communication device based on the relative position information and a motion relationship between the designated vehicle and the following vehicle, and the motion relationship is predicted on a dynamic map according to the first position information and the second position information.

In one embodiment, the tracking device 803 is configured to:
- perform the space grid division on the signal space between the first position information and the second position information in a signal space grid division way specified by a communication device to obtain grid spaces between the designated vehicle and the following vehicle;
- determine, from the grid spaces, a grid space through which the beam passes as an effective grid space according to the sending direction of the beam and the relative position information; and
- track the beam sent by the designated vehicle in the effective grid space.

Figure 9:
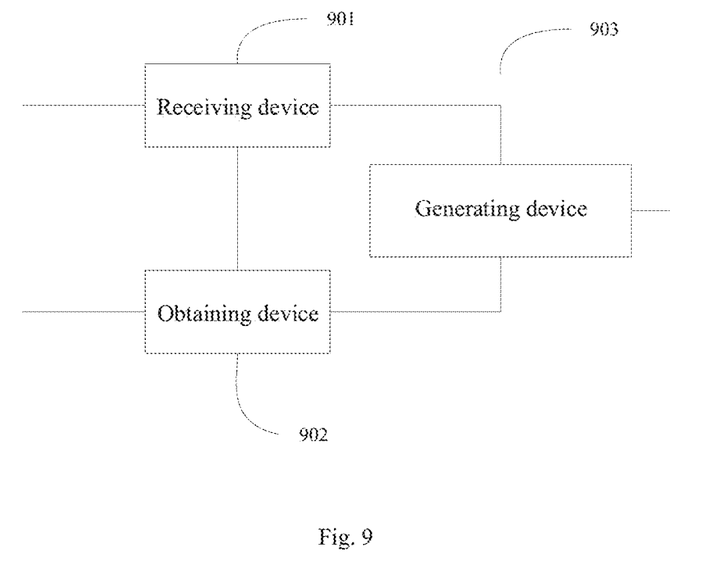
FIG. 9 is a schematic structural diagram of another beam tracking apparatus provided by an embodiment of the disclosure.

Based on the same inventive concept, embodiments of the disclosure provide another beam tracking apparatus applied to a communication device in the vehicle platooning. The specific embodiments of the beam tracking method of the apparatus can refer to the description of the method embodiments of the communication device, and the repeated description thereof will be omitted here. Referring to FIG. 9, the apparatus includes:
- a receiving device 901 configured to receive the first position information reported by a designated vehicle and the second position information reported by a following vehicle;
- an obtaining device 902 configured to obtain the relative position information of the designated vehicle and the following vehicle based on the first position information and the second position information; and
- a generating device 903 configured to generate the configuration information of the following vehicle according to the relative position information, so that the following vehicle tracks a beam sent by the preceding vehicle according to the configuration information.

In one embodiment, the generating device 903 is configured to:
- determine an optimal grid from a preset grid set according to the relative position information, so that the following vehicle can perform gridding processing on the signal space between the designated vehicle and the following vehicle according to the size or range indicated by the optimal grid; and
- package the optimal grid in a preset data format to generate the configuration information.

In one embodiment, the generating device 903 is configured to:

predict a motion relationship between the designated vehicle and the following vehicle on a dynamic map based on the first position information and the second position information; and generate the reception angle at which the following vehicle receives the beam based on the motion relationship and the relative position information to obtain the configuration information.

In one embodiment, the communication device is:

a base station or an RSU.

Based on the same inventive concept, embodiments of the disclosure provide a beam tracking apparatus including: at least one processor, and a memory connected to the at least one processor;

the memory stores instructions that can be executed by the at least one processor, and the at least one processor performs the beam tracking method as described above by executing the instructions stored in the memory.

Based on the same inventive concept, embodiments of the disclosure further provide a computer readable storage medium storing computer instructions. When the computer instructions are running on a computer, the computer is caused to perform the beam tracking method as described above when running on the computer.

In the embodiments provided by the disclosure, after the first position information of the designated vehicle and the second position information of the following vehicle are obtained in real time, the relative position information of the designated vehicle and the following vehicle is determined according to the first position information and the second position information, and then the beam sent by the designated vehicle is tracked according to the relative position information. Since the designated vehicle is in front of the following vehicle in the vehicle platooning, the beam sent to the following vehicle must be sent backwards. Therefore, the following vehicle can effectively track the beam of the designated vehicle according to the relative position information with respect to the designated vehicle, and improving the reliability in receiving the beam sent by the designated vehicle; and there is no need to scan the beams at positions other than those indicated by the relative position information, so the time of beam discovery can further be reduced.

Embodiments of the disclosure may be provided as methods, systems or computer program products. Thus the embodiments of the disclosure can take the form of hardware embodiments alone, software embodiments alone, or embodiments combining the software and hardware aspects. Also the embodiments of the disclosure can take the form of computer program products implemented on one or more computer usable storage mediums (including but not limited to magnetic disk memories, CD-ROMs, optical memories and the like) containing computer usable program codes therein.

The embodiments of the disclosure are described by reference to the flow charts and/or the block diagrams of the methods, the devices (systems) and the computer program products according to the embodiments of the disclosure. It should be understood that each process and/or block in the flow charts and/or the block diagrams, and a combination of processes and/or blocks in the flow charts and/or the block diagrams can be implemented by the computer program instructions. These computer program instructions can be provided to a general-purpose computer, a dedicated computer, an embedded processor, or a processor of another programmable data processing device to produce a machine, so that an apparatus for implementing the functions specified in one or more processes of the flow charts and/or one or more blocks of the block diagrams is produced by the instructions executed by the computer or the processor of another programmable data processing device.

These computer program instructions can also be stored in a computer readable memory which guides the computer or another programmable data processing device to operate in a particular way, so that the instructions stored in the computer readable memory produce a manufacture including the instruction apparatus which implements the functions specified in one or more processes of the flow charts and/or one or more blocks of the block diagrams.

These computer program instructions can also be loaded onto the computer or another programmable data processing device, so that a series of operation steps are performed on the computer or another programmable device to produce the computer-implemented processing. Thus the instructions executed on the computer or another programmable device provide steps for implementing the functions specified in one or more processes of the flow charts and/or one or more blocks of the block diagrams.

What is claimed is:

1. A beam tracking method, applied to a following vehicle in vehicle platooning and comprising:

receiving first position information of a designated vehicle;

obtaining relative position information of the designated vehicle and the following vehicle based on the first position information and second position information of the following vehicle;

tracking a beam sent by the designated vehicle based on the relative position information;

wherein the tracking the beam sent by the designated vehicle based on the relative position information, comprises:

tracking the beam sent by the designated vehicle at a configured reception angle based on the relative position information; wherein the configured reception angle is a range of reception angles at which the following vehicle receives the beam and which is calculated by a communication device based on the relative position information and a motion relationship between the designated vehicle and the following vehicle, and the motion relationship is predicted on a dynamic map according to the first position information and the second position information; or performing space grid division on a signal space between the first position information and the second position information in a signal space grid division way specified by a communication device to obtain grid spaces between the designated vehicle and the following vehicle; determining, from the grid spaces, a grid space through which the beam passes as an effective grid space according to a sending direction of the beam and the relative position information; and tracking the beam sent by the designated vehicle in the effective grid space.

2. The method of claim 1, wherein the first position information and the second position information each comprises at least one of:

longitude and latitude information;

lane information; or height information;

wherein the height information is a height of the designated vehicle or the following vehicle relative to a preset horizontal position.

3. The method of claim 2, wherein the obtaining relative position information of the designated vehicle and the following vehicle based on the first position information and second position information of the following vehicle, comprises:
calculating a vector angle of the following vehicle relative to the designated vehicle based on longitude and latitude information in the first position information and longitude and latitude information in the second position information to obtain the relative position information.

4. The method of claim 2, wherein the obtaining relative position information of the designated vehicle and the following vehicle based on the first position information and second position information of the following vehicle, comprises:
predicting a motion trajectory of the designated vehicle based on the first position information and driving information of the designated vehicle; and
calculating a relative motion relationship between the following vehicle and the designated vehicle according to the motion trajectory and the second position information to obtain the relative position information.

5. A computer readable storage medium storing computer instructions, wherein when the computer instructions are running on a computer, the computer is caused to perform the method of claim 1.

6. A beam tracking method, applied to a communication device in vehicle platooning and comprising:
receiving first position information reported by a designated vehicle and second position information reported by a following vehicle;
obtaining relative position information of the designated vehicle and the following vehicle based on the first position information and the second position information; and
generating configuration information of the following vehicle according to the relative position information, for the following vehicle to track a beam sent by the designated vehicle according to the configuration information;
wherein the generating configuration information of the following vehicle according to the relative position information, comprises:
determining an optimal grid from a preset grid set according to the relative position information, for the following vehicle to perform gridding processing on a signal space between the designated vehicle and the following vehicle according to a size or range indicated by the optimal grid; and packaging the optimal grid in a preset data format to generate the configuration information; or
predicting a motion relationship between the designated vehicle and the following vehicle on a dynamic map based on the first position information and the second position information; and generating a reception angle at which the following vehicle receives the beam based on the motion relationship and the relative position information to obtain the configuration information.

7. A beam tracking apparatus, comprising:
at least one processor; and
a memory connected to the at least one processor;
wherein the memory stores instructions that can be executed by the at least one processor, and the at least one processor, by executing the instructions stored in the memory, is configured for:
receiving first position information of a designated vehicle;
obtaining relative position information of the designated vehicle and a following vehicle based on the first position information and second position information of the following vehicle;
tracking a beam sent by the designated vehicle based on the relative position information;
wherein the at least one processor, by executing the instructions stored in the memory, is further configured for:
tracking the beam sent by the designated vehicle at a configured reception angle based on the relative position information; wherein the configured reception angle is a range of reception angles at which the following vehicle receives the beam and which is calculated by a communication device based on the relative position information and a motion relationship between the designated vehicle and the following vehicle, and the motion relationship is predicted on a dynamic map according to the first position information and the second position information; or
performing space grid division on a signal space between the first position information and the second position information in a signal space grid division way specified by a communication device to obtain grid spaces between the designated vehicle and the following vehicle; determining, from the grid spaces, a grid space through which the beam passes as an effective grid space according to a sending direction of the beam and the relative position information; and tracking the beam sent by the designated vehicle in the effective grid space.

8. The apparatus of claim 7, wherein the first position information and the second position information each comprises at least one of:
longitude and latitude information;
lane information; or
height information;
wherein the height information is a height of the designated vehicle or the following vehicle relative to a preset horizontal position.

9. The apparatus of claim 8, wherein the at least one processor, by executing the instructions stored in the memory, is further configured for:
calculating a vector angle of the following vehicle relative to the designated vehicle based on longitude and latitude information in the first position information and longitude and latitude information in the second position information to obtain the relative position information.

10. The apparatus of claim 8, wherein the at least one processor, by executing the instructions stored in the memory, is further configured for:
predicting a motion trajectory of the designated vehicle based on the first position information and driving information of the designated vehicle;
calculating a relative motion relationship between the following vehicle and the designated vehicle according to the motion trajectory and the second position information to obtain the relative position information.

11. A beam tracking apparatus, comprising:
at least one processor; and
a memory connected to the at least one processor;
wherein the memory stores instructions that can be executed by the at least one processor, and the at least one processor, by executing the instructions stored in the memory, is configured for:

receiving first position information reported by a designated vehicle and second position information reported by a following vehicle;

obtaining relative position information of the designated vehicle and the following vehicle based on the first position information and the second position information; and generating configuration information of the following vehicle according to the relative position information, for the following vehicle to track a beam sent by the designated vehicle according to the configuration information;

wherein the at least one processor, by executing the instructions stored in the memory, is further configured for:

determining an optimal grid from a preset grid set according to the relative position information, for the following vehicle to perform gridding processing on a signal space between the designated vehicle and the following vehicle according to a size or range indicated by the optimal grid; and packaging the optimal grid in a preset data format to generate the configuration information; or predicting a motion relationship between the designated vehicle and the following vehicle on a dynamic map based on the first position information and the second position information; and generating a reception angle at which the following vehicle receives the beam based on the motion relationship and the relative position information to obtain the configuration information.

* * * * *